(12) United States Patent
Konkle

(10) Patent No.: US 9,176,016 B2
(45) Date of Patent: Nov. 3, 2015

(54) SYSTEM AND METHOD FOR 3D PRINTER MATERIAL MANAGEMENT

(71) Applicant: Lamplight Games, El Dorado Hills, CA (US)

(72) Inventor: Timothy Konkle, El Dorado Hills, CA (US)

(*) Notice: Subject to any disclaimer, the term of this patent is extended or adjusted under 35 U.S.C. 154(b) by 343 days.

(21) Appl. No.: 13/949,113

(22) Filed: Jul. 23, 2013

(65) Prior Publication Data

US 2015/0027239 A1    Jan. 29, 2015

(51) Int. Cl.
*G01L 1/04* (2006.01)
*G01L 1/22* (2006.01)
*B29C 67/00* (2006.01)
*B65H 63/08* (2006.01)

(52) U.S. Cl.
CPC ............... *G01L 1/22* (2013.01); *B29C 67/0055* (2013.01); *B29C 67/0085* (2013.01); *B65H 63/084* (2013.01); *G01L 1/2231* (2013.01)

(58) Field of Classification Search
CPC ........... G01L 1/2231; G01L 1/04; G01L 1/14; G01L 3/24
USPC .............. 73/862.627, 862.621, 862.625, 862, 73/862.831, 862.325, 763, 862.044, 73/862.045, 862.338, 862.474; 242/563
See application file for complete search history.

(56) References Cited

U.S. PATENT DOCUMENTS

| | | | |
|---|---|---|---|
| 6,022,207 A | 2/2000 | Dahlin et al. | |
| 7,172,715 B2 | 2/2007 | Swanson et al. | |
| 7,896,209 B2* | 3/2011 | Batchelder et al. | 226/53 |
| 8,460,755 B2* | 6/2013 | Rodgers | 427/256 |
| 2004/0129823 A1* | 7/2004 | Swanson et al. | 242/563 |
| 2005/0145419 A1 | 7/2005 | Deters et al. | |
| 2010/0096485 A1* | 4/2010 | Taatjes et al. | 242/171 |
| 2010/0243784 A1* | 9/2010 | Johanson et al. | 242/422.4 |
| 2010/0327479 A1* | 12/2010 | Zinniel et al. | 264/172.14 |
| 2011/0180652 A1 | 7/2011 | Taatjes et al. | |

FOREIGN PATENT DOCUMENTS

EP        0246568 A2    11/1987

* cited by examiner

*Primary Examiner* — Lisa Caputo
*Assistant Examiner* — Nigel Plumb
(74) *Attorney, Agent, or Firm* — Kunzler Law Group

(57) ABSTRACT

The quantity of material remaining in a 3D printing system may be effectively measured through the use of a strain gauge. The strain gauge may be mounted on a support member such as a cantilevered support that holds the weight of a material dispenser. As the material is consumed, the strain gauge may measure the reduction in deformation of the cantilevered support, thereby indicating to a control system and/or a user the quantity of material used. Full and/or empty material dispenser measurements may be taken to provide reference points that indicate how close the material dispenser is to being full and/or empty. The material dispenser may be mounted in a variety of locations relative to the 3D printer, including on a side and on top. A top-mounted material dispenser may be received within a bearing that permits the material dispenser to rotate, allowing the material to unwind during consumption.

20 Claims, 4 Drawing Sheets

SYSTEM AND METHOD FOR 3D PRINTER MATERIAL MANAGEMENT

BACKGROUND

Additive manufacturing, or "3D printing," has recently become a popular way to create articles. 3D printing does not require the tooling and setup costs of a major production run, and in many instances, can be carried out on a relatively inexpensive 3D printer that may reside at the home of a user. Many commercially available 3D printing machines use files with the STL format; consequently, there is an ever-growing online library of shapes that can be made directly in a person's home.

3D printers can use a wide variety of materials including metals, ceramics, polymers, elastomers, and composites. Often, the material to be used for printing is stored in the form of a wire or "filament" that can be drawn into the 3D printer and used until depleted. The filament may be purchased, stored, and/or drawn from a material dispenser.

One common problem with existing 3D printers is knowing how much material remains in a given material dispenser. If there is insufficient material to carry out a given fabrication operation, the desired article will only be partially-formed. The user may not be able to resume the operation with new material; hence, the partially-formed article (and the material used to create it) may be wasted. Additionally, many known 3D printing systems do not indicate how much material is required by a given fabrication operation and/or how much material a given material dispenser contains.

SUMMARY

The subject matter of the present application has been developed in response to the present state of the art, and in particular, in response to the problems and needs in the art that have not yet been fully solved by currently available 3D printing systems. Accordingly, the subject matter of the present application has been developed to provide 3D printing material management systems and methods that overcome at least some shortcomings of the prior art.

According to one embodiment of the invention, an apparatus may include a material dispenser that retains and dispenses material for use in a fabrication process conducted by a fabricator, a support member that supports the material dispenser relative to the fabricator. The support member may have a load-bearing portion that undergoes a change in deformation in response to a change in weight of the material dispenser and a deformation measurement device positioned to measure deformation of the load-bearing portion, thereby indicating a change in weight of the material retained by the material dispenser.

The material dispenser may include a spool with a core. The material may be a filament wound around the core. The support member may extend from a side of the fabricator, and may have a proximal end secured to the fabricator and a distal end that supports the spool. The support member may include a post and a support arm that has the load-bearing portion. The support arm may be positioned proximate the proximal end and the post may extend from the side of the fabricator to support the spool.

The material dispenser may include a canister with an outer wall defining a cavity. The material may be a filament wound within the cavity. The support member may extend along a top of the fabricator, and may have a proximal end secured to the fabricator and a central portion that supports the canister. The canister may have an opening that permits egress of filament from the canister. The opening may be positioned proximate the central portion. The central portion may have a bearing that permits rotation of the canister relative to the central portion during dispensation of the filament from the canister.

The deformation measurement device may be a strain gauge mounted on the load-bearing portion such that the strain gauge deforms in response to deformation of the load-bearing portion. The strain gauge may provide an analog electrical signal proportional to deformation of the strain gauge. The apparatus may further include an analog to digital converter that receives the analog electrical signal and, based on the analog electrical signal, produces a digital electrical signal that indicates the deformation of the strain gauge. The apparatus may further include a controller that receives the digital electrical signal and, based on the digital electrical signal, indicates at least one of a quantity of material consumed by the fabrication process, a quantity of material consumed from the material dispenser, and a quantity of material retained by the material dispenser.

According to one embodiment of the invention, a method may include positioning a deformation measurement device to measure deformation of a load-bearing portion of a support member. The support member may be positioned to support a material dispenser relative to a fabricator such that the material dispenser retains and dispenses material for use in a fabrication process conducted by the fabricator. The method may further include measuring a first deformation of the load-bearing portion with the deformation measurement device and, based on the first deformation, determining at least one of a quantity of material consumed by the fabrication process, a quantity of material consumed from the material dispenser, and a quantity of material retained by the material dispenser.

The method may further include, prior to measuring the first deformation, placing an article on the support member. The article may be the material dispenser or a unit substantially identical to the material dispenser, and may have a full complement of material. The method may further include performing the fabrication process after measurement of the first deformation, and after performance of the fabrication process, measuring a second deformation of the load-bearing portion with the deformation measurement device. Determining at least one selection from the group may include using the first and second deformations to determine a quantity of material consumed from the material dispenser.

The method may further include, prior to measuring the first deformation, placing the material dispenser on the support member, performing the fabrication process after measurement of the first deformation and, after performance of the fabrication process, measuring a second deformation of the load-bearing portion with the deformation measurement device. Determining at least one selection from the group may include using the first and second deformations to determine a quantity of material consumed by the fabrication process.

The method may further include placing an article on the support member. The article may be the material dispenser or a unit substantially identical to the material dispenser and may have no material. The method may further include performing the fabrication process after measurement of the first deformation and, after performance of the fabrication process, measuring a second deformation of the load-bearing portion with the deformation measurement device. Determining at least one selection from the group may include using the first and second deformations to determine a quantity of material retained by the material dispenser.

The deformation measurement device may be a strain gauge. Positioning the deformation measurement device to measure deformation of the load-bearing portion may include mounting the strain gauge on the load-bearing portion such that the strain gauge deforms in response to deformation of the load-bearing portion.

The method may further include displaying, for a user, the selection from the group consisting of a quantity of material consumed by the fabrication process, a quantity of material consumed from the material dispenser, and a quantity of material retained by the material dispenser.

According to one embodiment of the invention, a system may include a fabricator that conducts a fabricating process in which a filament is consumed, a material dispenser that retains and dispenses the filament to the fabricator, a support member that supports the material dispenser relative to the fabricator. The support member may have a load-bearing portion that undergoes a change in deformation in response to a change in weight of the material dispenser. The system may further include a strain gauge positioned to measure deformation of the load-bearing portion and a controller connected to the strain gauge such that, in response to measurement of the deformation of the load-bearing portion, the controller indicates at least one selection from the group consisting of a quantity of filament consumed by the fabrication process, a quantity of filament consumed from the material dispenser, and a quantity of filament retained by the material dispenser.

The material dispenser may be a spool with a core, wherein the filament is wound around the core. The support member may have a proximal end secured to the fabricator and a distal end that supports the spool. The support member may have a post and a support arm having the load-bearing portion. The support arm may be positioned proximate the proximal end and the post may extend from a side of the fabricator to support the spool.

The material dispenser may be a canister with an outer wall defining a cavity within which the filament is wound. The support member may have a proximal end secured to the fabricator and a central portion that supports the canister on top of the fabricator. The canister may have an opening positioned proximate the central portion to permit egress of filament from the canister. The central portion may have a bearing that permits rotation of the canister relative to the central portion during dispensation of the filament from the canister.

The system may further have a display that displays, for a user, the selection from the group consisting of a quantity of filament consumed by the fabrication process, a quantity of filament consumed from the material dispenser, and a quantity of filament retained by the material dispenser.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figures 1, 2:
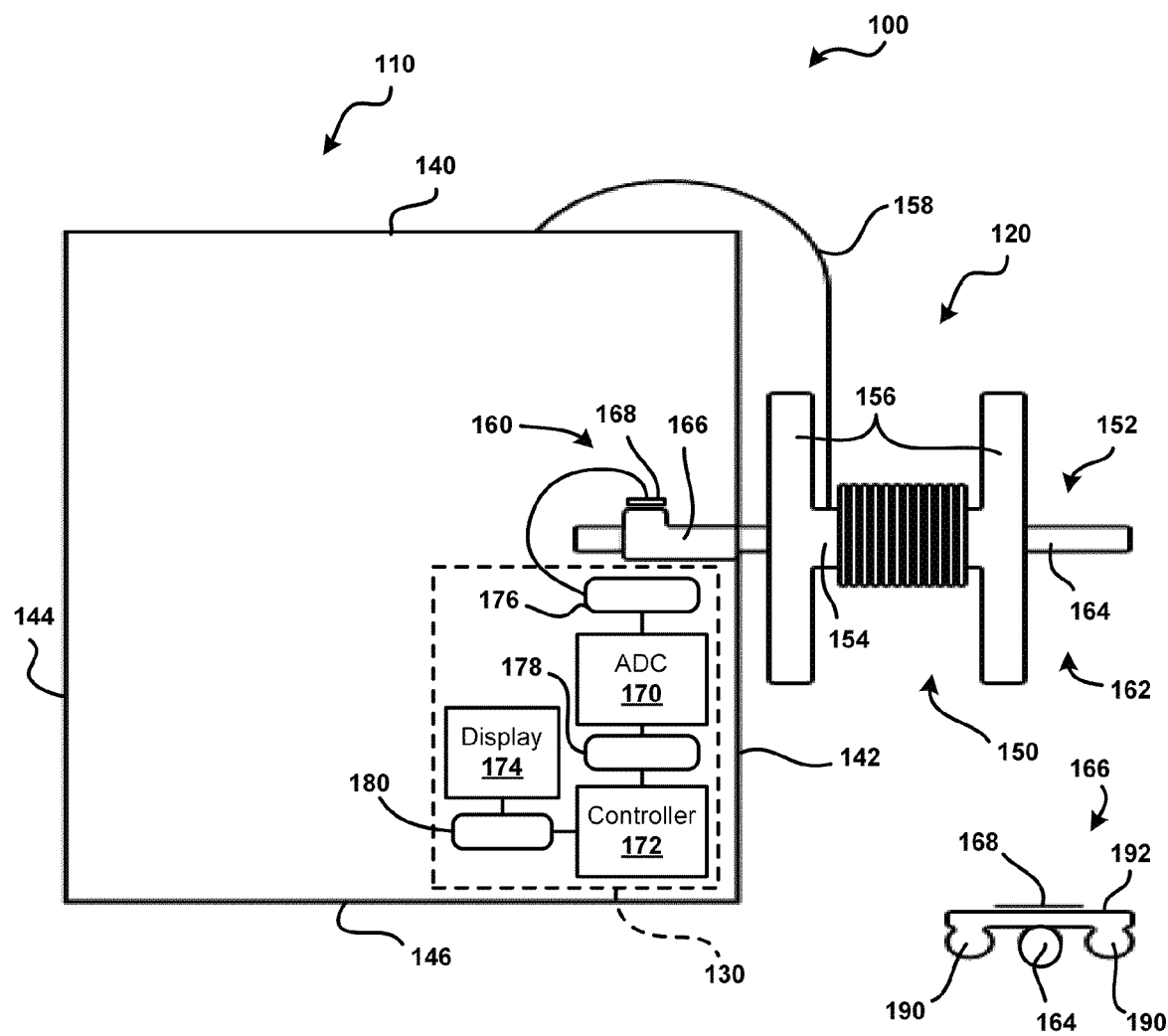
FIG. 1 is a front elevation view of a system according to one embodiment of the invention.
FIG. 2 is a side elevation view of the support arm of the system of FIG. 1.

Referring to FIG. 1, a front elevation view of a system 100 according to one embodiment of the invention. The system 100 may have a fabricator 110, a material supply assembly 120, and a control assembly 130.

The fabricator 110 may be an additive manufacturing machine such as a 3D printer, including but not limited to RepRap, RepRapPro, Solidoodle, Printerbot Jr., RoBo 3D, Fab@Home, Shark 3D and/or any other additive manufacturing machine or platform known in the art. The fabricator 110 may be designed for home, commercial, and/or industrial use.

The fabricator 110 need not be designed to fabricate finished articles. Rather, the fabricator 110 may be a machine designed to perform one or more steps prior to fabrication of finished articles, such as conversion of one form of material to another. According to one example, the fabricator 110 may consume material in the form of pellets or powder in order to fabricate filament that can be used as material for another fabricator.

The material supply assembly 120 may supply material to the fabricator 110. The fabricator 110 may form parts using metals, ceramics, polymers, elastomers, and/or composites. Hence, the material supply assembly 120 may be designed to deliver any such material to the fabricator 110. In some embodiments, the material may be in the form of a filament. In alternative embodiments, the material may be in powder, liquid, resin, pellets, or any other form known in the art.

In this application, the term "filament" encompasses any elongated stock of material suitable for use in additive manufacturing processes. A "filament" may refer to a single strand of material have an elongated, relatively easily bendable shape that can be continuously drawn into the fabricator 110. Alternatively, a "filament" may include multiple elongated pieces of material.

The control assembly 130 may be designed to indicate the amount of material remaining in the material supply assembly 120, the amount of material consumed from the material supply assembly 120, and/or the amount of material consumed by a given fabrication operation or set of fabrication operations. The control assembly 130 may be a dedicated system of on-board electronics built into the fabricator 110, or may be a computer or control system separate from and/or external to the fabricator 110. The control assembly 130 may thus include one or more personal computers running an operating system such as Windows, Linux, MacOS, or the like. Alternatively, the control assembly 130 may include one or more network terminals, ASICS, Arduinos, and/or any combination of computing hardware and software known in the art.

As mentioned above, the fabricator 110 may include any of a wide variety of known additive manufacturing devices. In certain embodiments, the fabricator 110 may be a desktop model made for home use. The fabricator 110 may generally have a rectangular shape with a top 140, a first side 142, a second side 144, and a bottom 146. The fabricator 110 may have fabrication table (not shown) or other interior structure on which the article to be fabricated is constructed, layer by layer.

The material supply assembly 120 may have a material dispenser 150 supported by a support member 152. The material dispenser 150 may be a disposable and/or replaceable unit. In the embodiment of FIG. 1, the material may be a filament, and the material dispenser 150 may be disposable spool that retains the filament until it has been consumed. Once the material dispenser 150 has been depleted, it may easily be replaced with a new one with a full complement of filament.

As shown, the material dispenser 150 may have a core 154, two flanges 156, and a filament 158 that is wrapped and/or wound around the core 154. The flanges 156 may be positioned on either side of the core 154 to keep the filament 158 from sliding off of the ends of the core 154. From the core 154, the filament 158 may be drawn into the fabricator 110 for consumption, for example, through the top 140 of the fabricator 110 as shown, or through the first side 142. The material dispenser 150 may rotate as the filament 158 is drawn into the fabricator 110 to dispense more of the filament 158 until the filament 158 is depleted. Then, the material dispenser 150 may be replaced with another material dispenser 150 with a full complement of filament 158, and the exposed end of the filament 158 thereof may be inserted into the fabricator 110.

In alternative embodiments, the material used may be any of a wide variety of materials including a filament, powder, liquid, resin, and/or pellets. In the event that the material is a powder, pellets, etc., a material dispenser according to the invention may be a hopper or other container that holds the material until it is dropped, extruded, or otherwise deposited into the fabricator 110 for consumption.

The support member 152 may have a proximal end 160 secured to the fabricator 110 and a distal end 162 that extends from the first side 142 as shown. In alternative embodiments, a support member may extend from either side and/or the front or back of the fabricator. Subsequently, alternative embodiments will illustrate positioning of the support member and material dispenser on the top of a fabricator.

The support member 152 may include a post 164, a support arm 166, and a strain gauge 168. The post 164 may generally extend between the proximal end 160 and the distal end 162 such that the distal end 162 extends from the first side 142 of the fabricator 110 to support the weight of the material dispenser 150. The post 164 may have a generally cylindrical shape that passes through the hollow interior of the core 154 of the material dispenser 150 such that the core 154 is able to rotate on the post 164.

The support arm 166 may be secured to the post 164 and to the fabricator 110 at the proximal end 160. As shown, the support arm 166 may be secured to the first side 142 of the fabricator 110 such that the support member 152 is cantilevered on the first side 142. The support arm 166 may serve to secure the post 164 to the first side 142.

The strain gauge 168 may be a circuit that provides output that varies with the strain experienced by the circuit. The strain gauge 168 may use a Wheatstone Bridge or any other known circuit type. The strain gauge 168 may be mounted to a member such that the strain gauge 168 undergoes strain proportional to that experienced by the member. Accordingly, the strain gauge 168 may measure the strain of the member. In the exemplary embodiment of FIG. 1, the strain gauge 168 may be mounted to the support arm 166, and may thus measure the strain occurring in the support arm 166.

Strain is the deformation of a material in response to loading. When the loading conditions of a member change, the level of strain in the member can also be expected to change. Measuring the strain of the member prior to and after the change in loading conditions may provide two strain levels that can be compared to indicate the change in loading conditions (for example, a change in weight supported by the member).

Returning to the example of FIG. 1, the weight of the material dispenser 150 may be transmitted through the post 164 to the support arm 166 in the form of a downwardly-oriented linear force and a bending moment. In response, the support arm 166 will bend slightly, perhaps to a degree imperceptible by the human eye. However, the strain gauge 168 may be sensitive enough to measure this bending deformation. Similarly, as the filament 158 is consumed, the weight of the material dispenser 150 may decrease, and the linear force and/or the bending moment exerted on the support arm 166 may similarly decrease. The result may be a reduction in the bending deformation of the support arm 166. The reduced level of strain in the support arm 166 may be measured by the strain gauge 168. When compared with the previous, higher level of strain, this new strain measurement may indicate the change in weight of the material dispenser 150, thereby indicating the quantity of the filament 158 that was consumed between the two measurements.

The support member 152 may be made such that the strain experienced by the post 164 and the support arm 166 are, at all times, within the elastic deformation limits of the materials used to build them. The post 164 and the support arm 166 may be formed of a wide variety of materials including metals, ceramics, plastics, composites, and the like. With most materials, elastic deformation is reversible; however, stresses that induce strain beyond the material's elastic deformation limits may result in non-reversible, or plastic deformation, which may lead to inconsistencies between observed strain levels and the corresponding loading conditions.

The control assembly 130 may include various components that enable processing, interpretation, and/or display of the output of the strain gauge 168. More precisely, the control assembly 130 may have an analog-to-digital converter, or ADC 170, a controller 172, and/or a display 174.

The ADC 170 may be designed to receive an analog electrical signal 176 provided by the strain gauge 168. The ADC 170 or a different source may also provide an excitation current that is transmitted to the strain gauge 168. The strain gauge 168 may operate by measuring resistance that varies with deformation of the conductors that form its circuit; accordingly, the excitation current may be needed to enable measurement of resistance and generate the analog electrical signal 176. The ADC 170 may convert the analog electrical signal 176 into a digital electrical signal 178 that can be received and/or processed by a computing device such as the controller 172. The ADC 170 may also receive and process other analog electrical signals produced and/or received by the fabricator 110, or may be provided exclusively for use with the strain gauge 168.

The controller 172 may receive the digital electrical signal 178 from the ADC 170. The controller 172 may be a device that controls other aspects of the operation of the fabricator 110. For example, the controller 172 may receive the file for creation, and may control the various servo motors and/or other components that guide the fabrication process. Alternatively, the controller 172 may be provided exclusively for use with the strain gauge 168 and/or the ADC 170.

The controller 172 may process the digital electrical signal 178 and, based on the digital electrical signal 178, provide a display signal 180. The display signal 180 may contain information regarding the weight of the material dispenser 150, the quantity of filament 158 remaining in the material dispenser 150, the quantity of filament 158 of the material dispenser 150 that has been consumed in total, the quantity of filament 158 consumed for a given fabrication operation, and/or any other data that may be desired by a user and/or other aspects of the system 100.

The display signal 180 may be received by the display 174. The display 174 may be an LCD screen, LED display, and/or any other display type on which information can be displayed for viewing by a user. The display 174 may be a dedicated screen, or may be a component of a computing system such as a computer monitor. The display 174 may be used to display various information regarding the operation of the fabricator 110. Alternatively, the display 174 may be provided exclusively for use with the strain gauge 168, the ADC 170, and/or the controller 172.

In the alternative to the use of the display 174, the information provided by the strain gauge 168 may be conveyed to the user through other methods, such as a printout, an audible signal, an indicator such as a light (i.e., a "low filament" indicator), etc. In other embodiments, the information provided by the strain gauge 168 need not be presented to the user at all.

For example, a system (not shown) may have multiple material supply assemblies, each of which may have its own material dispenser and strain gauge. All of the strain gauges may be linked to a single controller, which may automatically determine which material dispenser to use based on the indication provided by the strain gauges of the material remaining on each dispenser.

Yet further, if desired, a system (not shown) may automate replacement of the material dispenser. Thus, based on the output of the strain gauge, the system may determine when the material dispenser is in need of replacement, and may initiate the replacement at the appropriate time.

Referring to FIG. 2, a side elevation view illustrates the support arm 166 of the system 100 of FIG. 1 in greater detail. As shown, the support arm 166 may have two anchors 190 positioned to either side of the post 164. The anchors 190 may be secured together by a panel 192 that also passes over the top of the post 164. The anchors 190 may be secured to the first side 142 of the fabricator 110. The top of the post 164 may be secured to the underside of the panel 192. The strain gauge 168 may be mounted to the top of the panel 192.

When a load, such as the weight of the material dispenser 150, is placed on the distal end 162, or more specifically, on the post 164 proximate the distal end 162, the load may exert force on the panel 192, which may transmit that force to the first side 142 via the anchors 190. The panel 192 may thus define a load-bearing portion of the support member 152 that undergoes changes in deformation in response to changes in weight of the material dispenser 150. The strain gauge 168 may be mounted to the panel 192 so as to deform in tandem with the panel 192. Thus, the strain gauge 168 may measure the level of deformation in the panel 192, and thereby, indicate the weight of the material dispenser 150.

FIGS. 1 and 2 present only one of many possible implementations of the present invention. In other embodiments, different materials besides filaments may be used; such materials include powders, liquids, resins, pellets, or any other material forms known in the art. Such materials may require the use of material dispensers much different from the material dispenser 150 of FIG. 1. The present invention may be applied to any such material dispensers, including hoppers, extruders, and any other material dispenser type known in the art.

Similarly, in other embodiments in which the material is a filament, the material dispenser may have other configurations and/or locations than illustrated in FIGS. 1 and 2. For example, the material dispenser may include a canister or cartridge in place of a spool, and may be located on the front, on the back, on top of, or underneath the fabricator.

Furthermore, the strain gauge 168 represents only one of many possible deformation measurement devices. In other embodiments, optical comparators, magnetic measurement systems, and/or any other device capable of measuring the deformation of an object may be used in place of the strain gauge 168. The deformation measurement device need not be positioned as in FIG. 1, but may be positioned at a wide variety of locations to measure a wide range of support member types. The support member need not be cantilevered like the support member 152, but may have any configuration that supports the associated material dispenser while undergoing measurable strain in relation to the weight of the material dispenser.

Figure 3:
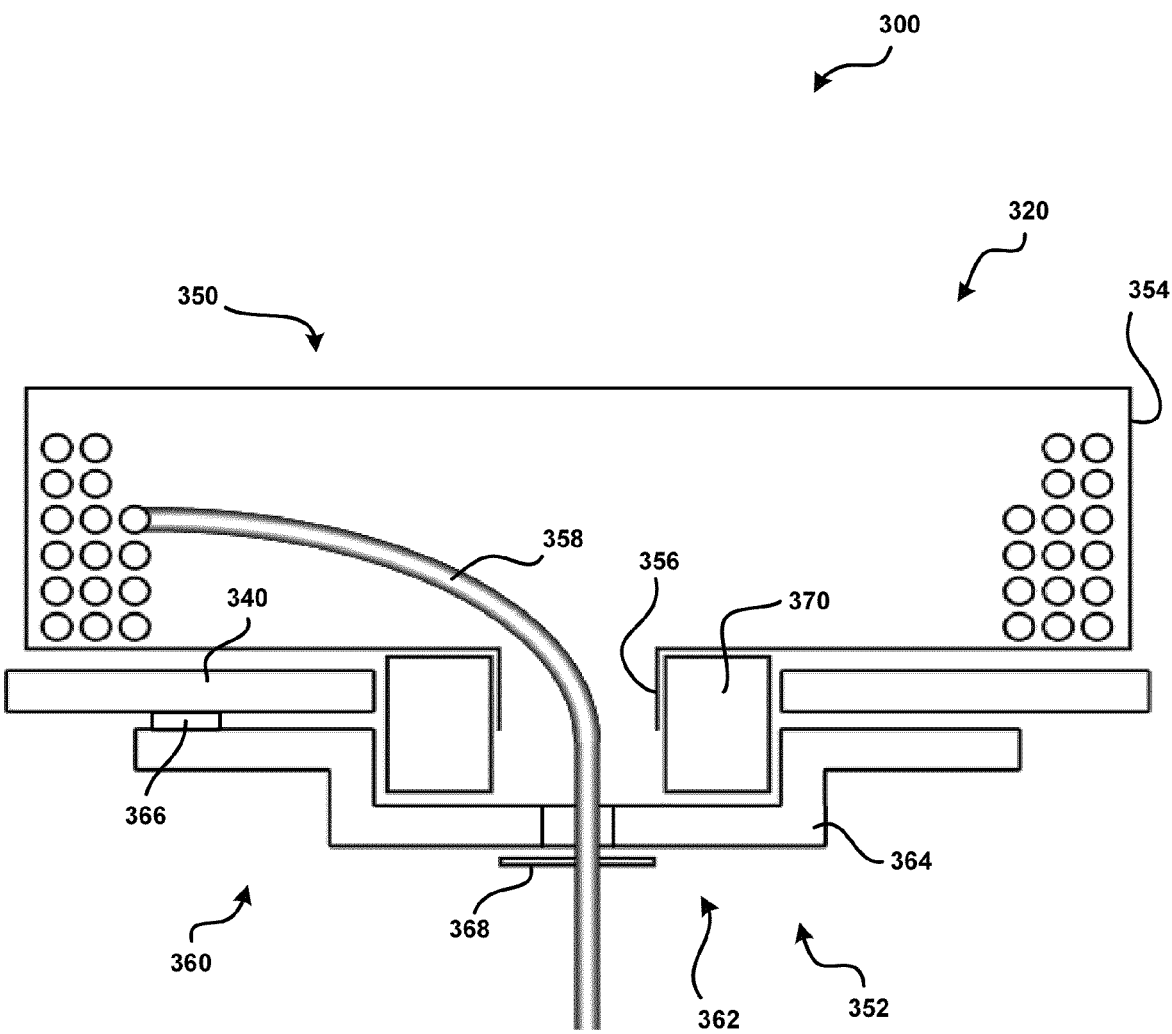
FIG. 3 is a front elevation view of a portion of a system according to one alternative embodiment of the invention.

Referring to FIG. 3, a front elevation view illustrates a portion of a system 300 according to one alternative embodiment of the invention. The system 300 may include a fabricator (only shown in part), which may be similar to the fabricator 110 of FIG. 1, except that the fabricator of the system 300 may receive filament from a material supply assembly 320 that is on a top 340 of the fabricator. The system 300 may also optionally have a control assembly 130 like that of FIG. 1.

The material supply assembly 320 may have a material dispenser 350 and a support member 352. The material dispenser 350 may take the form of a canister, which may have an outer wall 354 with a generally tubular shape. The outer wall 354 may define an opening 356 in the lower end. The outer wall 354 may contain a filament 358, which may be wound, wrapped, or otherwise retained within the cavity. The filament 358 may advantageously be wound in a pattern such that the filament 358 can be drawn from the opening 356 without catching, bunching, or otherwise impeding the ability of the fabricator to receive the filament 358 at a steady pace until the filament 358 has been depleted.

The support member 352 may have a proximal end 360 secured to the top 340 of the fabricator, and a central portion 362 on which the material dispenser 350 rests. The support member 352 may include a flange 364 that extends generally from the proximal end 360, across the central portion 362. The flange 364 may have a generally discoid shape with a central recess that receives the opening 356 of the material dispenser 350. The flange 364 may have an aperture aligned with the opening 356 of the material dispenser 350 to permit the filament 358 to enter the fabricator. The flange 364 may be secured to the top 340 proximate the proximal end 360 by a block 366, which may be mounted to the top 340 and to the flange 364. Alternatively, the block 366 may be omitted and the flange 364 may be secured directly to the top 340.

The support member 352 may also include a strain gauge 368, which may be mounted to the flange 364, proximate the central portion 362. The flange 364, proximate the central portion 362, may thus be the load-bearing portion of the support member 352 for which deformation is to be measured to indicate the weight of the material dispenser 350.

The strain gauge 368 may be positioned at a variety of locations. Securing the flange 364 to the top 340 only at the proximal end 360 may enable the flange 364 to deflect as it supports the weight of the material dispenser 350. Although the bending moment, and hence the deflection, may be largest proximate the proximal end 360, there may be sufficient bending at the central portion 362 to enable the strain gauge 368 to detect significant changes in deformation of the central portion 362 as the weight of the material dispenser 350 changes.

Accordingly, the strain gauge 368 may serve a function similar to that served by the strain gauge 168 of FIGS. 1 and 2. When the weight of the material dispenser 350 changes, the level of deflection of the central portion 362 of the support member 352 may change. The new deformation level of the central portion 362 may be detected by the strain gauge 368 and, when compared with the previous deformation level, may indicate the change in weight in the material dispenser 350. This, in turn, may indicate the quantity of strain gauge 368 that has been consumed between the two measurements. As mentioned previously, the system 300 of FIG. 3 may utilize the control assembly 130 as described in connection with FIG. 1. Accordingly, the output from the strain gauge 368 may be digitized, converted, analyzed, and/or displayed as set forth in the description of FIG. 1.

The central recess of the flange 364 may retain a collar 370, which may have a generally tubular shape. The collar 370 may receive the material dispenser 350 proximate the opening 356. As shown, the outer wall 354 of the material dispenser 350 may have a narrow extension leading to the opening 356; this narrow extension may be received within the collar 370.

Placing the material dispenser 350 on the top 340 of the fabricator may have a number of advantages. It may reduce the footprint of the fabricator and may help avoid interference with the material dispenser 350 by articles to the sides, front, and back of the fabricator. Additionally, it may facilitate loading of the material dispenser 350 and help avoid interference with feeding the filament 358 to the fabricator as there need not be any filament 358 left exposed outside the fabricator.

As the filament 358 is drawn into the top 340 of the fabricator, it may gradually unwind the filament 358 within the material dispenser 350. This may cause a significant torsional force in the filament 358. This torsional force may stress the filament 358 and, if not relieved, may result in binding, knotting, and/or breakage of the filament 358 during the feeding process. Accordingly, in alternative embodiments of the invention, it may be advantageous to permit relative rotation between the material dispenser 350 and the top 340 of the fabricator to relax this torsional loading.

Figure 4:
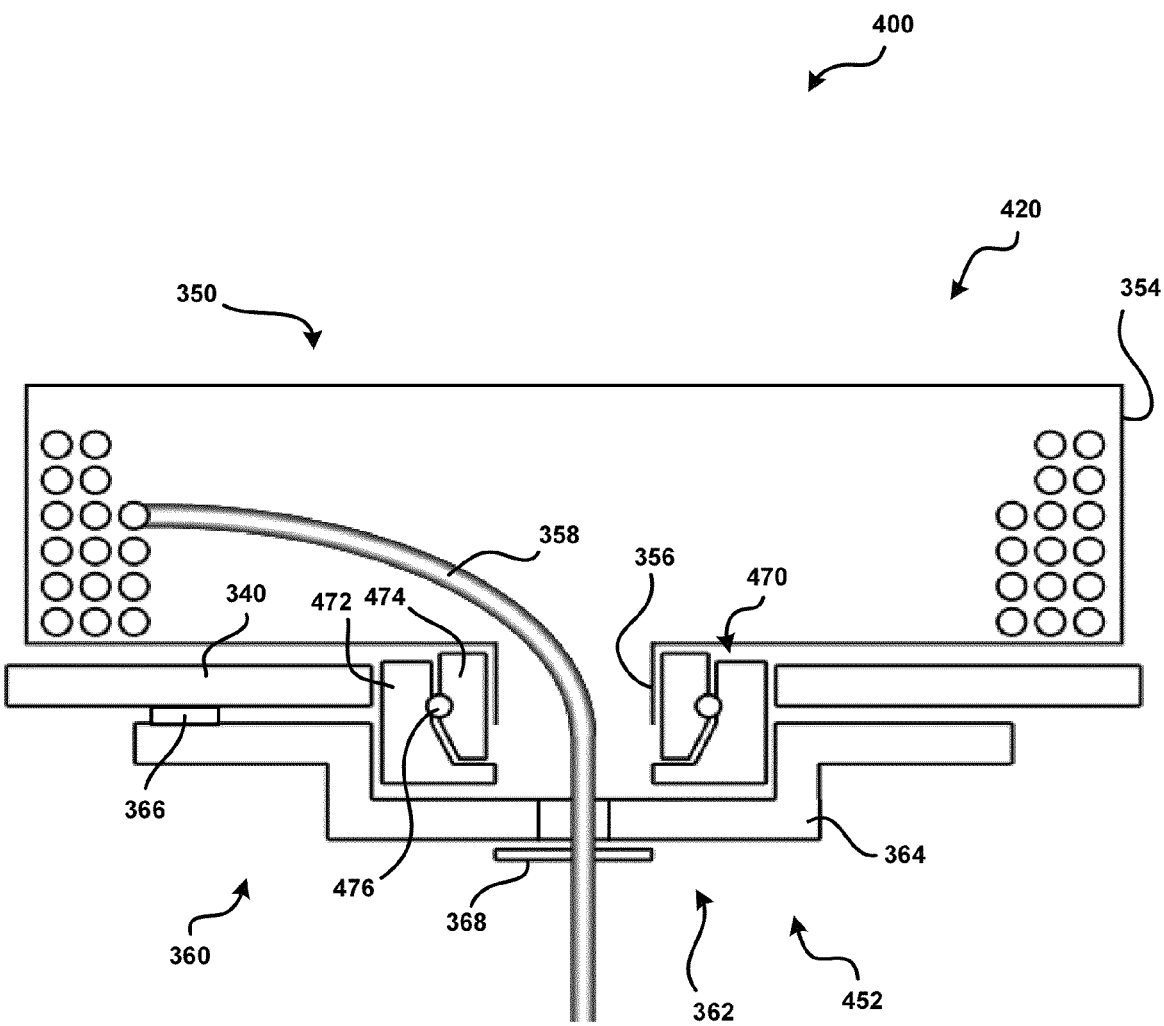
FIG. 4 is a front elevation view of a portion of a system according to another alternative embodiment of the invention.

Referring to FIG. 4, a front elevation view illustrates a portion of a system 400 according to another alternative embodiment of the invention. The system 400 may be similar to the system 300, with a few exceptions as noted below. Accordingly, components of the system 400 that are the same as their counterparts of the system 300 may have the same numbers.

The system 400 may have a fabricator (only partially shown) with a top 340 on which the material supply assembly 420 is located. The top 340 may have a material dispenser 350 like that of the embodiment of FIG. 3, and a support member 452 secured to the top 340 of the fabricator. The support member 452 may be configured similarly to the support member 352 of the previous embodiment, except that the support member 452 may have a bearing 470 in place of the collar 370 of the previous embodiment. The bearing 470 may facilitate relative rotation between the material dispenser 350 and the top 340 of the fabricator, without permitting the material dispenser 350 to become dislodged from its position on the top 340.

The bearing 470 may include any of a variety of types, including bushings, ball bearings, roller bearings, jewel bearings, fluid bearings, magnetic bearings, and flexure bearings. The bearing 470 may be of any type that facilitates rotation between the material dispenser 350 and the top 340, and may thus have a generally tubular shape with an interior surface that rotates relative to its exterior surface.

As embodied in FIG. 4, the bearing 470 may be a ball bearing. Thus, the bearing 470 may have an outer race or outer ring 472, an inner race or inner ring 474, and a plurality of balls 476 arranged between the outer ring 472 and the inner ring 474. The balls 476 may rotate within the space between the outer ring 472 and the inner ring 474, thereby allowing the inner ring 474 to rotate within the outer ring 472, which may remain substantially stationary.

Allowing the material dispenser 350 to rotate relative to the fabricator may beneficially help to release torsional stress within the filament 358. The material dispenser 350 may rotate continuously on the fabricator during consumption of the filament 358 to release this torsional stress.

Figure 5:
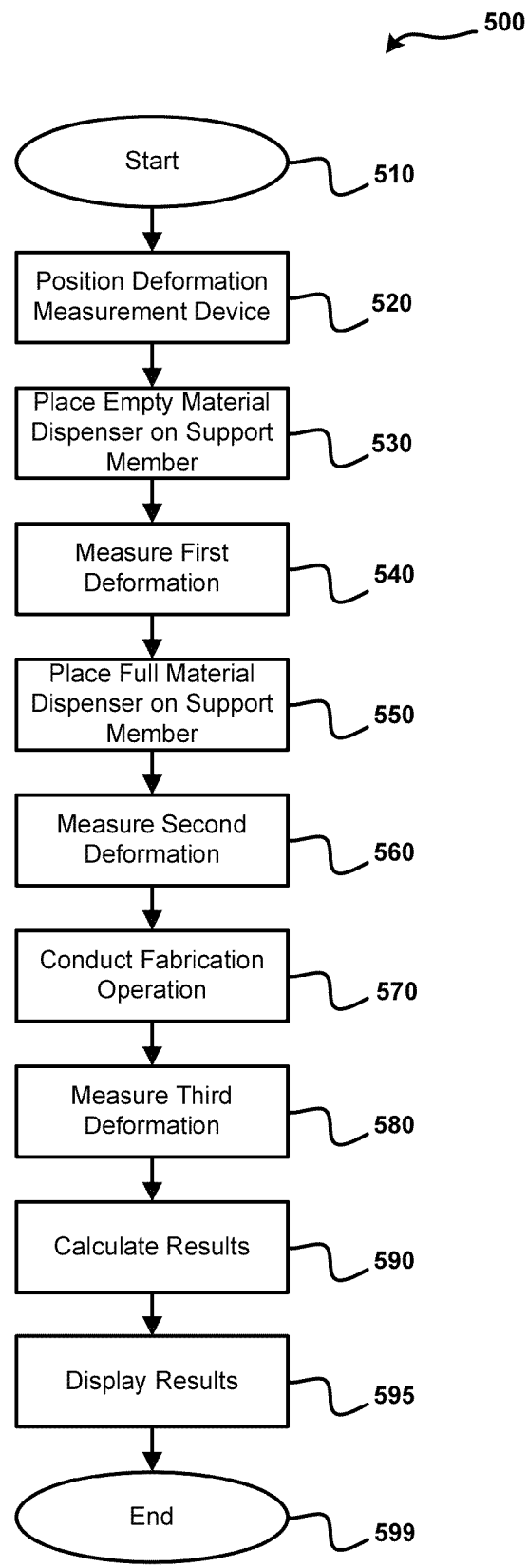
FIG. 5 is a flowchart diagram that illustrates a method of determining useful information regarding a material dispenser, according to one embodiment of the invention.

Referring to FIG. 5, a flowchart diagram illustrates a method 500 of determining useful information regarding a material dispenser, according to one embodiment of the invention. The method 500 may be used in conjunction with the system 100, the system 300, the system 400, or any other alternative system within the scope of the present disclosure. Accordingly, the method 500 is not tied to any specific deformation measurement device, material type, material dispenser, material dispenser location, control system, or fabricator. However, by way of example, the method 500 will be described in connection with the system 100 of FIGS. 1 and 2.

The method 500 may start 510 with a step 520 in which the deformation measurement device (such as the strain gauge 168) is positioned to measure deformation of the support member. In FIG. 1, this may entail mounting the strain gauge 168 to a load-bearing portion of the support member 152, i.e., the support arm 166. However, where alternative types of deformation measurement devices are used, such devices may not be mounted to the support member, but may instead be relatively positioned to detect deformation through measurement of optical signals, magnetic signals, or the like.

The step 520 may be performed by a user in a retrofit situation (i.e., retrofitting an existing fabricator 100 by adding the strain gauge 168 and/or other components to facilitate measurement of the weight of the material dispenser 150). Alternatively, the step 520 may be carried out at the factory. In any case, the step 520 may only need to be performed once to enable weight measurement for multiple fabrication operations.

Once the deformation measurement device has been properly positioned, the method 500 may proceed to a step 530 in which an empty material dispenser may be placed on the support member. This may entail, for example, placing an empty spool or canister on the support member 152 or the support member 352.

With the empty material dispenser in place, the method 500 may proceed to a step 540 in which a first level of deformation is measured. More precisely, the level of deformation of the load-bearing portion of the support member may be measured by the deformation measurement device. Returning to the example of the system 100 of FIG. 1, this may entail subjecting the strain gauge 168 to an excitation current and then receiving the resulting analog electrical signal 176. The analog electrical signal 176 may be digitized by the ADC 170 and the resulting digital electrical signal 178 may be converted into a measurement of the weight of the material dispenser 150 in the empty condition. The corresponding first weight may be recorded and/or displayed for future use.

The step 530 and the step 540 may be carried out in a wide variety of ways, and are also optional. According to some embodiments, the step 530 and the step 540 may be part of the initial calibration of the system 100, and may thus be performed only once. The first weight may be retained in memory and referenced as additional fabrication operations are carried out. Alternatively, the step 530 and the step 540 may be omitted in favor of storing the first weight in the system 100 prior to first use, i.e., at the factory. The material dispenser 150 may be substantially identical to other material dispensers that are offered as replacements; hence, the spool of the material dispenser 150 may have substantially the same weight as those of other material dispensers that would be used to replace it. Accordingly, a factory preset first weight may be adequate and may obviate the step 530 and the step 540.

Once the weight of the empty material dispenser has been measured and recorded, the method 500 may proceed to a step 550 in which a full material dispenser may be placed on the support member. This may entail, for example, placing an unused spool or canister on the support member 152 or the support member 352. The unused spool or canister may have a full complement of filament.

With the full material dispenser in place, the method 500 may proceed to a step 560 in which a second level of deformation is measured. More precisely, the level of deformation of the load-bearing portion of the support member may be measured by the deformation measurement device. As in the discussion of the step 540, in the example of FIG. 1, this may entail subjecting the strain gauge 168 to an excitation current, receiving the resulting analog electrical signal 176, digitizing the analog electrical signal 176, converting he resulting digital electrical signal 178 into a measurement of the weight of the material dispenser 150 in the full condition, and then recording and/or displaying the corresponding second weight for future use.

As set forth above in the description of the step 530 and the step 540, the step 550 and the step 560 may be carried out in a wide variety of ways, and are also optional. According to some embodiments, the step 550 and the step 560 may also be part of the initial calibration of the system 100, and may thus be performed only once. The second weight may be retained in memory and referenced as additional fabrication operations are carried out. Alternatively, the step 550 and the step 560 may be omitted in favor of storing the first weight in the system 100 prior to first use, i.e., at the factory. As mentioned previously, the material dispenser 150 may be substantially identical to other material dispensers that are offered as replacements; hence, the spool of the material dispenser 150 and the filament 158 included in the full material dispenser 150 may have substantially the same weight as those of other material dispensers that would be used to replace it. Accordingly, a factory preset second weight may be adequate and may obviate the step 550 and the step 560.

Once the weight of the full material dispenser has been measured and recorded, the method 500 may proceed to a step 570 in which the fabricator (such as the fabricator 110) conducts a fabrication operation. This may entail initiating the fabrication of an article. The fabrication process will consume some of the material of the material dispenser. Thus, upon completion of the fabrication process, the material dispenser will be at least partially depleted.

Once the fabrication operation has been completed, the method 500 may proceed to a step 580 in which a third level of deformation is measured. More precisely, the level of deformation of the load-bearing portion of the support member may be measured by the deformation measurement device. As in the discussion of the step 540 and the step 560, in the example of FIG. 1, this may entail subjecting the strain gauge 168 to an excitation current, receiving the resulting analog electrical signal 176, digitizing the analog electrical signal 176, converting the resulting digital electrical signal 178 into a measurement of the weight of the material dispenser 150 in the full condition, and then recording and/or displaying the corresponding third weight for future use.

Once the first, second, and third weights have been obtained, the method 500 may proceed to a step 590 in which the first weight, the second weight, and the third weight are compared to ascertain some helpful information. For example, subtracting the weight of the material dispenser after performing one or more fabrication operations (for example, the third weight) from the second weight (the weight of a full material dispenser) may indicate the total quantity of material that has been consumed from that material dispenser.

Subtracting the weight of the material dispenser after performing a single fabrication operation from the second weight may indicate the quantity of material consumed by that fabrication operation. Similarly, subtracting the weight of the material dispenser after performance of a fabrication operation from the weight of the material dispenser immediately prior to performing the fabrication operation (for example, subtracting a fourth weight obtained after performance of a second fabrication operation from the third weight) may indicate the quantity of material consumed by that fabrication operation (i.e., the second fabrication operation).

Subtracting the weight of the empty material dispenser (the first weight) from the weight of the full material dispenser (the second weight) may indicate the total amount of material stored by the material dispenser. Subtracting the weight of the empty material dispenser (the first weight) from the weight of the material dispenser after performance of one or more fabrication operations (for example, the third weight) may indicate the amount of material retained by the material dispenser after performance of the one or more fabrication operations.

Those of skill in the art will recognize that various steps of FIG. 5 may be omitted, reordered, altered, or replaced within the scope of the present invention. Accordingly, FIG. 5 provides only one example of a wide variety of methods that may be used in accordance with the present invention.

A person of skill in the art will recognize that other useful information may be obtained through the use of the systems and methods of the present invention. For example, the rate of consumption of material during a fabrication process may indicate whether the fabricator is functioning properly. Thus, it may be useful to continuously use the deformation measurement device to measure and record the deformation level of the load-bearing portion of the support member, thereby providing an ongoing diagnostic of the fabricator. Any sudden changes in the consumption rate may be logged and/or indicated to the user to provide notice of a potential malfunction.

Furthermore, known fabricators may have a stepper motor or other predictable motor system that pulls in material, for example, along a known rotational arc of the stepper motor, the arc length of which may represent an ideal linear length of filament. The 3D object being printed may have G codes and timings that provide the ideal length of time that filament is extruded. Therefore, the weight measurements provided by this invention may also be useful for calibrating extrusion ramp-up times, extrusion ramp-down times, and/or material properties for both material consumption and job time.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a material dispenser that retains and dispenses material for use in a fabrication process conducted by a fabricator;
   a support member that supports the material dispenser relative to the fabricator, wherein the support member comprises a load-bearing portion that undergoes a change in deformation in response to a change in weight of the material dispenser; and
   a deformation measurement device positioned to measure deformation of the load-bearing portion, thereby indicating a change in weight of the material retained by the material dispenser.

2. The apparatus of claim 1, wherein the material dispenser comprises a spool comprising a core, wherein the material comprises a filament wound around the core.

3. The apparatus of claim 2, wherein the support member extends from a side of the fabricator, the support member comprising a proximal end secured to the fabricator and a distal end that supports the spool.

4. The apparatus of claim 3, wherein the support member comprises a post and a support arm comprising the load-bearing portion, wherein the support arm is positioned proximate the proximal end and the post extends from the side of the fabricator to support the spool.

5. The apparatus of claim 1, wherein the material dispenser comprises a canister comprising an outer wall defining a cavity, wherein the material comprises a filament wound within the cavity.

6. The apparatus of claim 5, wherein the support member extends along a top of the fabricator, the support member comprising a proximal end secured to the fabricator and a central portion that supports the canister, the canister comprising an opening that permits egress of filament from the canister, wherein the opening is positioned proximate the central portion.

7. The apparatus of claim 6, wherein the central portion comprises a bearing that permits rotation of the canister relative to the central portion during dispensation of the filament from the canister.

8. The apparatus of claim 1, wherein the deformation measurement device comprises a strain gauge mounted on the load-bearing portion such that the strain gauge deforms in response to deformation of the load-bearing portion, wherein the strain gauge provides an analog electrical signal proportional to deformation of the strain gauge.

9. The apparatus of claim 8, further comprising an analog to digital converter that receives the analog electrical signal and, based on the analog electrical signal, produces a digital electrical signal that indicates the deformation of the strain gauge.

10. The apparatus of claim 9, further comprising a controller that receives the digital electrical signal and, based on the digital electrical signal, indicates at least one of:
    a quantity of material consumed by the fabrication process;
    a quantity of material consumed from the material dispenser; and
    a quantity of material retained by the material dispenser.

11. A method comprising:
    positioning a deformation measurement device to measure deformation of a load-bearing portion of a support member, wherein the support member is positioned to support a material dispenser relative to a fabricator such that the material dispenser retains and dispenses material for use in a fabrication process conducted by the fabricator;
    measuring a first deformation of the load-bearing portion with the deformation measurement device; and based on the first deformation, determining at least one selection from the group consisting of:
   a quantity of material consumed by the fabrication process;
   a quantity of material consumed from the material dispenser; and
   a quantity of material retained by the material dispenser.

12. The method of claim 11, further comprising:
prior to measuring the first deformation, placing an article on the support member, the article comprising the material dispenser or a unit substantially identical to the material dispenser, the article having a full complement of material;
performing the fabrication process after measurement of the first deformation; and
after performance of the fabrication process, measuring a second deformation of the load-bearing portion with the deformation measurement device;
wherein determining at least one selection from the group comprises using the first and second deformations to determine a quantity of material consumed from the material dispenser.

13. The method of claim 11, further comprising:
prior to measuring the first deformation, placing the material dispenser on the support member;
performing the fabrication process after measurement of the first deformation; and
after performance of the fabrication process, measuring a second deformation of the load-bearing portion with the deformation measurement device;
wherein determining at least one selection from the group comprises using the first and second deformations to determine a quantity of material consumed by the fabrication process.

14. The method of claim 11, further comprising:
placing an article on the support member, the article comprising the material dispenser or a unit substantially identical to the material dispenser, the article having no material;
performing the fabrication process after measurement of the first deformation; and
after performance of the fabrication process, measuring a second deformation of the load-bearing portion with the deformation measurement device;
wherein determining at least one selection from the group comprises using the first and second deformations to determine a quantity of material retained by the material dispenser.

15. The method of claim 14, wherein the deformation measurement device comprises a strain gauge, wherein positioning the deformation measurement device to measure deformation of the load-bearing portion comprises mounting the strain gauge on the load-bearing portion such that the strain gauge deforms in response to deformation of the load-bearing portion.

16. The method of claim 11, further comprising displaying, for a user, the selection from the group consisting of:
   a quantity of material consumed by the fabrication process;
   a quantity of material consumed from the material dispenser; and
   a quantity of material retained by the material dispenser.

17. A system comprising:
a fabricator that conducts a fabricating process in which a filament is consumed;
a material dispenser that retains and dispenses the filament to the fabricator;
a support member that supports the material dispenser relative to the fabricator, wherein the support member comprises a load-bearing portion that undergoes a change in deformation in response to a change in weight of the material dispenser;
a strain gauge positioned to measure deformation of the load-bearing portion; and
a controller connected to the strain gauge such that, in response to measurement of the deformation of the load-bearing portion, the controller indicates at least one selection from the group consisting of:
   a quantity of filament consumed by the fabrication process;
   a quantity of filament consumed from the material dispenser; and
   a quantity of filament retained by the material dispenser.

18. The system of claim 17, wherein the material dispenser comprises a spool comprising a core, wherein the filament is wound around the core, wherein the support member comprises a proximal end secured to the fabricator and a distal end that supports the spool, wherein the support member comprises a post and a support arm comprising the load-bearing portion, wherein the support arm is positioned proximate the proximal end and the post extends from a side of the fabricator to support the spool.

19. The system of claim 17, wherein the material dispenser comprises a canister comprising an outer wall defining a cavity within which the filament is wound, wherein the support member comprises a proximal end secured to the fabricator and a central portion that supports the canister on top of the fabricator, the canister comprising an opening positioned proximate the central portion to permit egress of filament from the canister, wherein the central portion comprises a bearing that permits rotation of the canister relative to the central portion during dispensation of the filament from the canister.

20. The system of claim 17, further comprising a display that displays, for a user, the selection from the group consisting of:
   a quantity of filament consumed by the fabrication process;
   a quantity of filament consumed from the material dispenser; and
   a quantity of filament retained by the material dispenser.

* * * * *